(12) United States Patent
Yun

(10) Patent No.: US 11,852,552 B2
(45) Date of Patent: Dec. 26, 2023

(54) PRESSURE SENSOR WITH A COMMUNICATING PASSAGE IN A STRAIGHT LINE

(71) Applicant: KOREA ELECTRIC TERMINAL CO., LTD., Incheon (KR)

(72) Inventor: Hyun Seok Yun, Seoul (KR)

(73) Assignee: KOREA ELECTRIC TERMINAL CO., LTD., Incheon (KR)

( * ) Notice: Subject to any disclaimer, the term of this patent is extended or adjusted under 35 U.S.C. 154(b) by 190 days.

(21) Appl. No.: 17/437,559

(22) PCT Filed: Mar. 19, 2020

(86) PCT No.: PCT/KR2020/003775
§ 371 (c)(1),
(2) Date: Sep. 9, 2021

(87) PCT Pub. No.: WO2020/197168
PCT Pub. Date: Oct. 1, 2020

(65) Prior Publication Data
US 2022/0163419 A1    May 26, 2022

(30) Foreign Application Priority Data
Mar. 26, 2019   (KR) .................. 10-2019-0034599

(51) Int. Cl.
G01L 19/00   (2006.01)
G01L 19/06   (2006.01)
G01L 19/14   (2006.01)

(52) U.S. Cl.
CPC ...... *G01L 19/0672* (2013.01); *G01L 19/0084* (2013.01); *G01L 19/142* (2013.01)

(58) Field of Classification Search
None
See application file for complete search history.

(56) References Cited

U.S. PATENT DOCUMENTS 9,541,437 B2 *   1/2017   Tokuyasu ................ G01F 15/14
9,714,851 B2 *   7/2017   Bertsch ................ G01D 11/245
(Continued)

FOREIGN PATENT DOCUMENTS

JP         06-117952 A        4/1994
JP         06117952     *     4/1994
(Continued)

*Primary Examiner* — Brandi N Hopkins
*Assistant Examiner* — Nigel H Plumb
(74) *Attorney, Agent, or Firm* — NKL LAW; Jae Youn Kim

(57) ABSTRACT

A pressure sensor with a communicating passage in a straight line. The pressure sensor includes a main body housing having an inner space and having a connector part provided for connection with an outside thereof. In the main body housing, the first end of a terminal is located in the inner space and the second end thereof is located in the connector part. A substrate is provided in the inner space of the main body housing and on which a sensing element is mounted, a cover housing coupled to the main body housing and comprising a seal configured to be in close contact with the main body housing and with edges of one surface of the sensing element. A communicating passage communicates with the inner space in a straight line, and thus communicates with one surface of the sensing element at a downstream side thereof.

11 Claims, 5 Drawing Sheets

(56) References Cited

U.S. PATENT DOCUMENTS

2006/0260408 A1* 11/2006 Villa .................... G01L 9/0045
                                                       427/372.2
2016/0195413 A1*  7/2016 Bertsch ............... B29D 99/006
                                                         73/431
2018/0058970 A1*  3/2018 Garre .................... G01L 27/00

FOREIGN PATENT DOCUMENTS

| JP | 10-206261 A |  | 8/1998 |
| JP | 10206261 | * | 8/1998 |
| JP | H10-206261 A |  | 8/1998 |
| JP | 2007114001 A |  | 5/2007 |
| JP | 2007121196 A |  | 5/2007 |
| JP | 2014085299 A |  | 5/2014 |
| JP | 2015-083937 A |  | 4/2015 |
| JP | 2016505844 A |  | 2/2016 |
| JP | 2016505845 A |  | 2/2016 |
| JP | 2017-528711 A |  | 9/2017 |
| KR | 10-1483769 B1 |  | 1/2015 |
| KR | 10-2016-0147503 A |  | 12/2016 |
| KR | 1020160147503 | * | 12/2016 |
| KR | 10-2017-0079582 A |  | 7/2017 |

* cited by examiner

PRESSURE SENSOR WITH A COMMUNICATING PASSAGE IN A STRAIGHT LINE

TECHNICAL FIELD

The present disclosure relates generally to a pressure sensor and, more particularly, to a pressure sensor configured to sense a pressure change occurring in response to deformation of a tube connecting a pressure sensor to another pressure sensor.

BACKGROUND ART

Many devices are employed in vehicles to secure human safety. Most of these devices are mainly for the safety of vehicle occupants, but recently, devices for the safety of pedestrians have also been employed in vehicles. One of the devices is a pedestrian airbag provided for preventing the head or upper body of a pedestrian from hitting a vehicle body secondarily during a collision between the pedestrian and a vehicle.

In general, when a pedestrian and a vehicle collide, the lower body of the pedestrian hits a bumper of the vehicle first, and as the vehicle moves or the pedestrian falls, the head and upper body of the pedestrian hits the vehicle secondarily. Therefore, the vehicle senses a collision between the bumper and the pedestrian, and deploys the airbag at a front windshield glass on the basis of a signal thereby preventing pedestrian injuries occurring when the upper body including the head of the pedestrian hits the vehicle.

For achieving the purpose, a tube is provided in the bumper to be extended along the bumper, and pressure sensors are provided at opposite ends of the tube, and when a pressure change is generated in the tube due to a collision with a pedestrian, the pressure sensors sense the pressure change to determine the collision with the pedestrian.

Each of the pressure sensors should be configured such that pressure in the tube is set at atmospheric pressure at all times. However, when the pressure in the tube is set at atmospheric pressure such that the tube and the outside of the pressure tube communicate by flow paths passing through the pressure sensor, the flow paths including a vent flow path passing through the inside of the pressure sensor clog by various reasons to cause breakdown.

Specifically, when the flow path in the pressure sensor for adjusting pressure between the tube and the outside is not formed in a straight line, there is the possibility for flow clogging in many portions of the flow path Furthermore, a communicating passage between the tube and a sensing element is not formed in a straight line, a pressure change of fluid transferred from the tube may be transmitted to the sensing element relatively late by flow loss.

DISCLOSURE

Technical Problem

Accordingly, the present disclosure has been made keeping in mind the above problems occurring in the related art, and the present disclosure is intended to provide a pressure sensor of which a substrate is completely isolated from the outside.

Another objective of the present disclosure is intended to provide a pressure sensor of which a vent flow path is separated from the inside of the pressure sensor.

A further objective of the present disclosure is intended to provide a pressure sensor of which a sensing element and a tube communicate with each other via a communicating passage formed in a straight line.

A further objective of the present disclosure is intended to provide a pressure sensor in which a pressure change of fluid is rapidly transmitted from a tube to a sensing element and/or to a vent flow path of the pressure sensor.

Technical Solution

In order to achieve the above objectives, a pressure sensor according to the present disclosure includes: a main body housing having an inner space, and having a connector part provided for connection with an outside thereof, wherein a first end of a terminal is located in the inner space and a second end thereof is located in the connector part; a substrate provided in the inner space of the main body housing and on which a sensing element is mounted; a cover housing coupled to the main body housing and comprising a seal configured to be in close contact with the main body housing and with edges of one surface of the sensing element; a communicating passage communicating with the inner space in a straight line, thus communicating with the sensing element at a downstream side thereof; and a discharge path communicating with both the communicating passage and the outside of the pressure sensor and configured to allow pressure in a tube connected to the communicating passage to be maintained at atmospheric pressure.

An inflow orifice may be provided at the downstream side of the communicating passage so that fluid rapidly may flow into the sensing element.

A discharge orifice may be provided at a downstream side of the discharge path so that the fluid may be rapidly discharged via the discharge path.

The pressure sensor may include a discharge tube extended from the discharge path and having an outlet configured to communicate with the outside of the pressure sensor.

The pressure sensor may include a membrane provided in the outlet and configured to block delivering of foreign substances such as water, dust, or the like into the discharge path and to pass only air.

The outlet may be configured such that a flow sectional area thereof may be enlarged as the outlet goes to a downstream thereof and an inner surface thereof may be inclined.

The membrane may be provided at a discharge orifice located between the discharge path and the outlet to be located in the outlet.

The seal may have a sensor seating portion that may be configured to be in close contact with lateral surfaces and the edges of the upper surface of the sensing element by encompassing the lateral surfaces and the edges of the upper surface of the sensing element in order to seal the communicating passage and the inner space.

The seal may be integrally formed in the cover housing by insert molding.

Advantageous Effects

The pressure sensor according to the present disclosure can have effects as follows.

First, in the pressure sensor of the present disclosure, the inner space of the main body housing can be sealed from the outside by the cover housing and the seal provided in the cover housing. Specifically, one surface of the sensing element provided in the substrate provided in the inner space communicates with the communicating passage outside the inner space. However, the communicating passage and the inner space are blocked by the element seating portion encompassing the sensing element so that the inner space is completely blocked from the outside to prevent the components in the inner space from being affected by the outside. Accordingly, operation reliability of the pressure sensor can be improved.

Next, in the pressure sensor of the present disclosure, the discharge path provided for maintaining the inside of the tube at atmospheric pressure may communicate with the communicating passage in the tube connection part connected to the tube and may be separated from the inner space. Accordingly, the components in the inner space may not be affected by the vent flow path, so operation reliability of the pressure sensor may be improved.

In the pressure sensor of the present disclosure, the communicating passage connected to the tube provided in the bumper may be formed in a straight line to the sensing element. Accordingly, a pressure change of fluid in the tube may be transmitted with minimal loss. The communicating passage, i.e. a flow path of the fluid, may be formed in a straight line, so that the sensing element can sense the pressure change of the fluid more accurately.

In the pressure sensor of the present disclosure, the fluid in the tube may be transferred to the sensing element via the communicating passage by a collision impact. The inflow orifice may be provided in the downstream of the communicating passage, so the fluid may be transferred rapidly to the sensing element. The time that the sensing element senses a pressure change may become relatively short by the above configuration of the pressure sensor.

MODE FOR INVENTION

Figure 1:
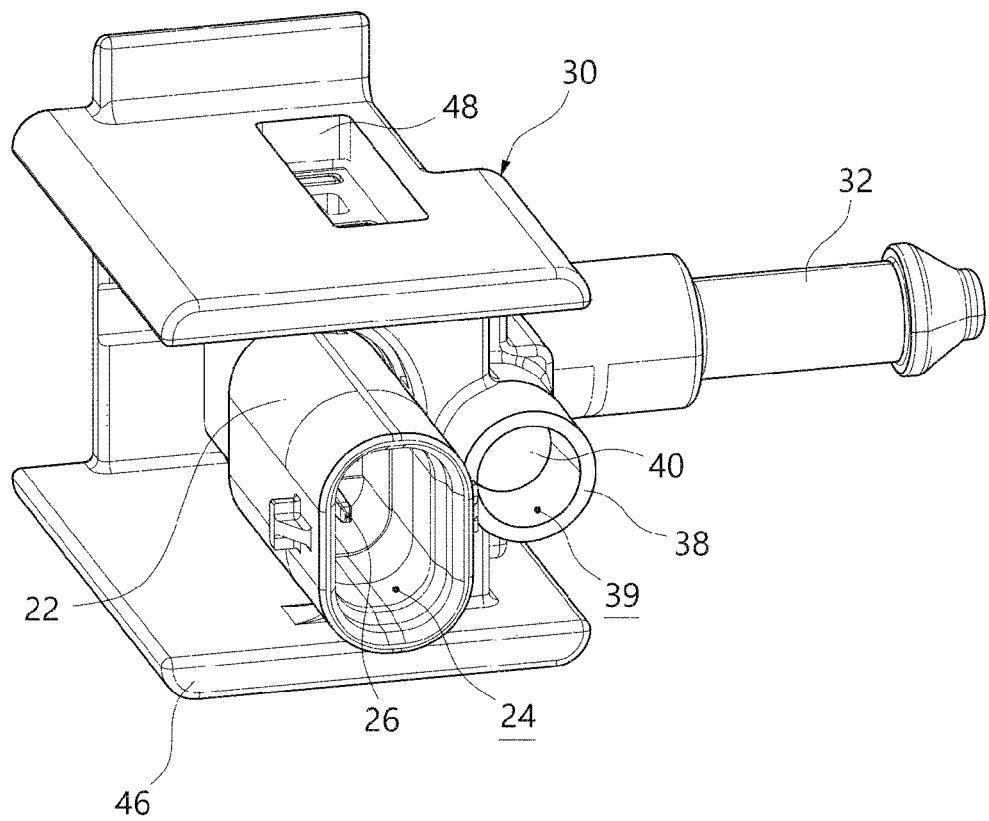
FIG. 1 is a perspective view showing a pressure sensor according to a preferred embodiment of the present disclosure.
Figure 2:
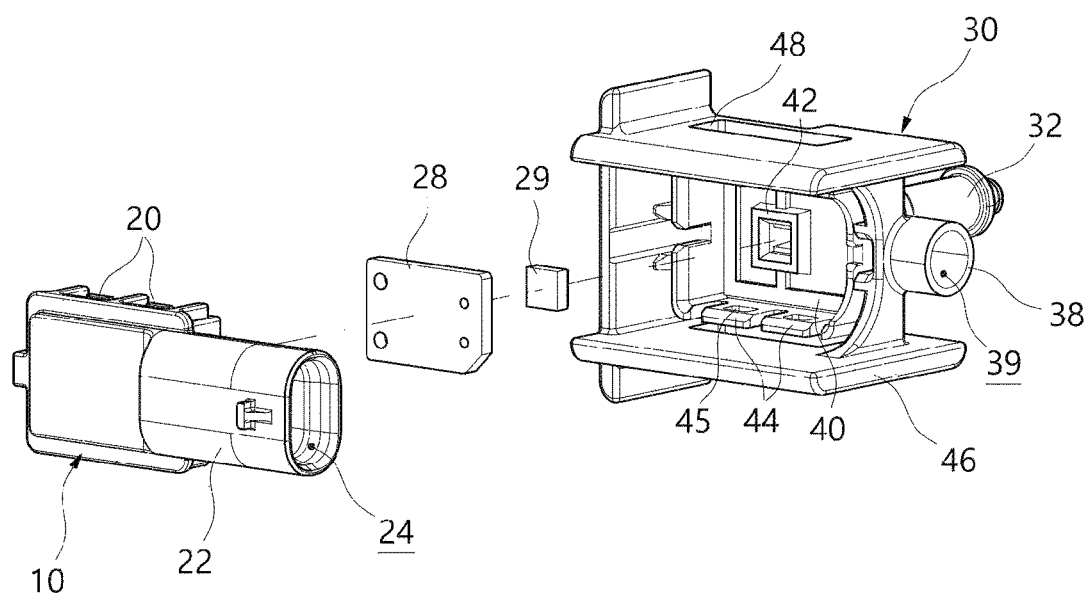
FIG. 2 is an exploded perspective view showing configuration of the embodiment of the present disclosure.

Hereinbelow, some embodiments of the present disclosure will be described in detail with reference to exemplary drawings. Like reference numerals are used to identify like elements throughout different drawings. Further, in the following description, when it is decided that the detailed description of known function or configuration related to the present disclosure makes the subject matter of the present disclosure unclear, the detailed description is omitted.

Further, when describing the components of the present disclosure, terms such as first, second, A, B, (a) or (b) may be used. Since these terms are provided merely for the purpose of distinguishing the components from each other, they do not limit the nature, sequence or order of the components. It will be understood that when an element is referred to as being "coupled" or "connected" to another element, it can be directly coupled or connected to the other element or intervening elements may be present therebetween.

As shown in accompanying drawings, a main body housing 10 may constitutes a frame and a part of exterior of a pressure sensor according to an embodiment of the present disclosure. The main body housing 10 may be made by molding an insulating synthetic resin material. A bottom plate 12 may constitute one side portion of the main body housing 10, and a side wall 14 may encompass edges of the bottom plate 12. The bottom plate 12 and the side wall 14 may provide an inner space 16 inside the main body housing 10. In the inner space 16, a substrate 28 which will be described below and a part of a terminal 26 electrically connected to the substrate 28 may be provided therein. The inner space 16 may be sealed from the outside of the pressure sensor by a cover housing 30 and a seal 40 which will be described below. A plurality of supports 18 may protrude on portions in the inner space 16. The supports 18 may be portions on which the substrate 28 is seated.

Coupling protrusions 20 may protrude on an outside surface of the side wall 14. The coupling protrusions 20 may be provided for coupling between the main body housing 10 and the cover housing 30. The coupling protrusions 20 may protrude on outside surfaces of opposite portions of the side wall 14, the outside surfaces facing each other, in opposite directions. In the embodiment, two coupling protrusions 20 may be paired and provided on the side wall 14.

A connector part 22 may be provided on another side portion of the main body housing 10. The connector part 22 may be provided for signaling connection with the outside of the pressure sensor, and may be a portion to which another connector (not shown) may be connected. A coupling space 24 may be formed in the connector part 22 and be open at an end of the connector part 22. The other connector may be inserted into and coupled to the inside of the coupling space 24. A second end of the terminal 26 may be located in the coupling space 24. The terminal 26 may be integrally formed in the main body housing 10 when the main body housing 10 is manufactured. For example, the terminal 26 may be integrally formed in the main body housing 10 by insert molding, and a first end of the terminal 26 may be located in the inner space 16 and the second end thereof may be located in the coupling space 24.

The substrate 28 may be provided on the supports 18 of the inner space 16. The substrate 28 may have a circuit board constituting the pressure sensor, and a sensing element 29 configured to sense pressure is provided on the substrate 28. The sensing element 29 may sense a pressure change and transmit the pressure change to the other connector via the circuit board of the substrate 28 and the terminal 26.

Figure 3:
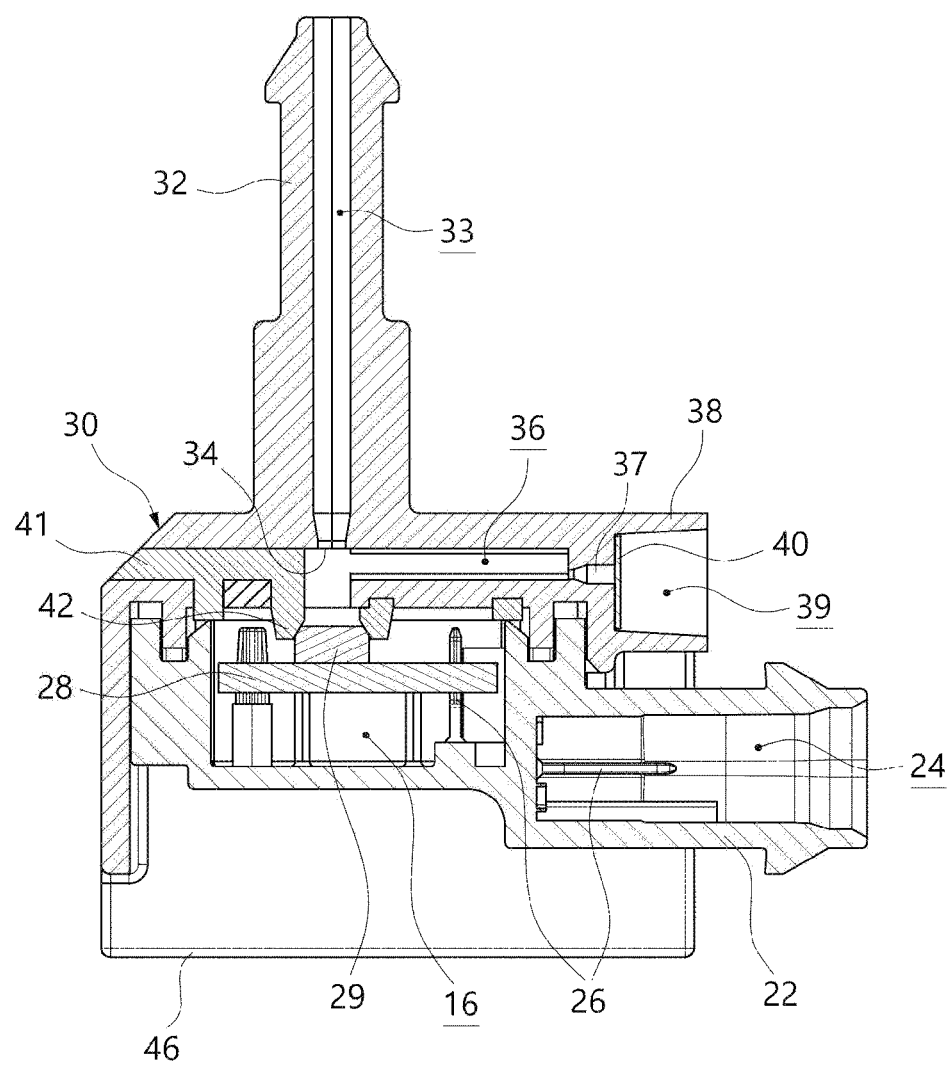
FIG. 3 is a sectional view showing the configuration of the embodiment of the present disclosure.
Figure 4:
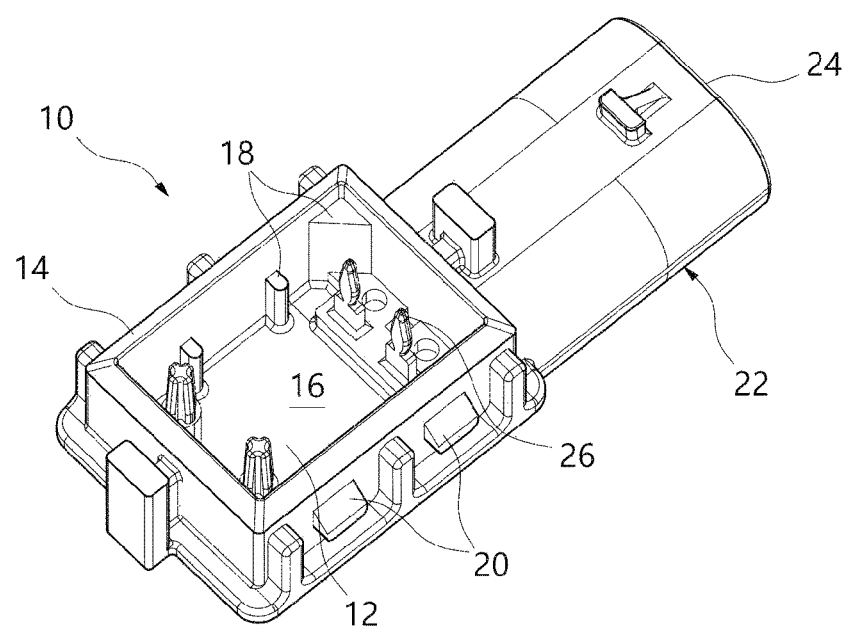
FIG. 4 is a perspective view showing a main body housing constituting the embodiment of the present disclosure.
Figure 5:
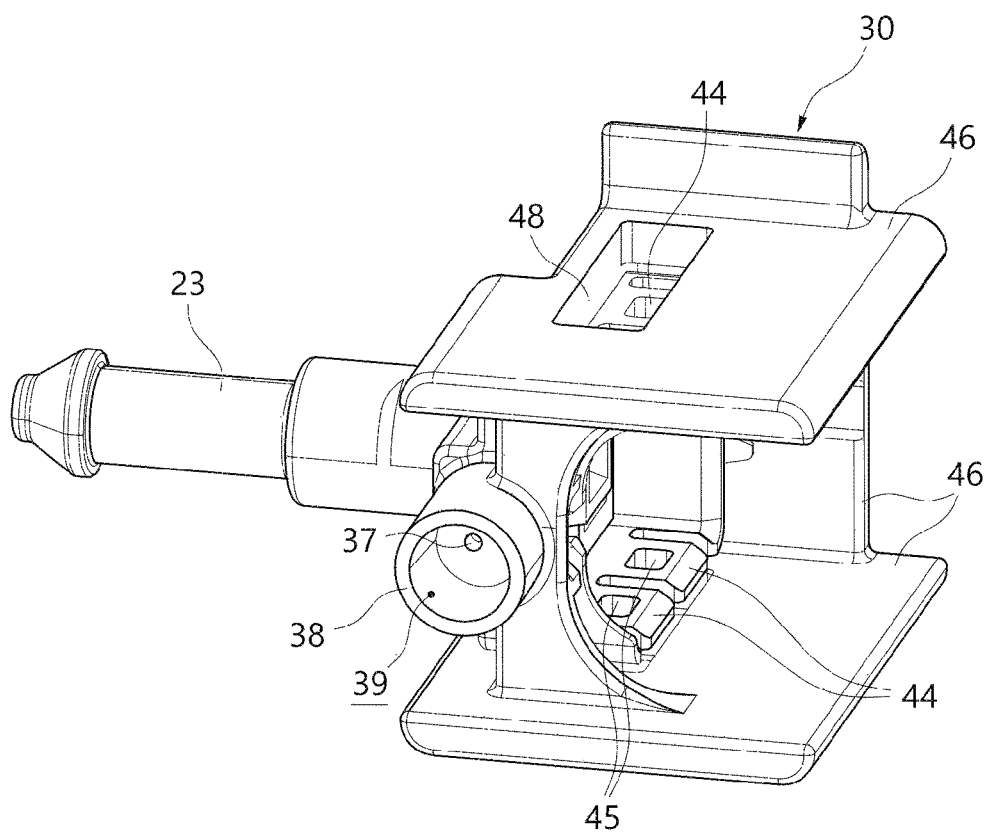
FIG. 5 is a perspective view showing a cover housing constituting the embodiment of the present disclosure.

The cover housing 30 may be coupled to the main body housing 10 to seal the inner space 16 from the outside of the pressure sensor. The cover housing 30 may also be made of an insulating synthetic resin material. The tube connection part 32 may protrude on one lateral portion of the cover housing 30. A communicating passage 33 may be formed inside the tube connection part 32. The sensing element 29 provided in the substrate 28 may be located at one longitudinal end of the communicating passage 33. The communicating passage 33 may be extended from a fore end of the tube connection part 32 to a location of one surface of the sensing element 29 provided in the main body housing 10. The communicating passage 33 may be disposed straightly as shown in FIG. 3. The communicating passage 33 may be disposed straightly from the entrance of the communicating passage 33 to the sensing element 29 without a bent portion.

Therefore, a fluid pressure change in the tube may be transmitted to the sensing element 29 without delay.

An inflow orifice 34 may be provided in a downstream side of the communicating passage 33. The inflow orifice 34 may be provided to allow the fluid flowing toward the sensing element 29 to flow faster. With the inflow orifice 34 as the center, a flow sectional area in the communicating passage 33 widens and narrows, whereby pressure of the fluid may be lowered and fluid speed may be faster. Therefore, the fluid in the communicating passage 33 may flow faster.

Meanwhile, a discharge path 36 may be provided outside one portion of the communicating passage 33. The discharge path 36 may serve to allow the pressure in the tube to be equal to the atmospheric pressure at all times. Therefore, the communicating passage 33 may communicate with the outside of the pressure sensor. A discharge orifice 37 may be provided in a downstream side of the discharge path 36. The discharge orifice 37 may serve to allow the fluid in the discharge path 36 to flow faster. For achieving the above purpose, flow sectional areas of portions located before and after the discharge orifice 37 may be formed relatively larger than a flow sectional area of the discharge orifice 37.

A discharge tube 38 may be provided at a location after the discharge orifice 37, and the discharge tube 38 may have an outlet 39. The outlet 39 may be seen as part of the discharge path 36. A flow sectional area of the outlet 39 may be formed larger than a flow sectional area of the discharge path 36 located before the discharge orifice 37. The structure may be to prevent the discharge path 36 from being blocked at the outlet 39 by a peripheral object. However, the pressure sensor should be formed such that an operator's finger does not enter the inside of the outlet 39, so it may be preferable that a flow sectional area of the outlet 39 is not formed larger than a predetermined size.

A membrane 40 may be provided in the outlet 39 at the discharge orifice 37. The membrane 40 may be made of synthetic resin, and air may pass through but water or dust cannot pass through the membrane 40. Therefore, as the membrane 40 is provided in the pressure sensor, entering of water or dust from the outside through the outlet 39 into the discharge path 36, the communicating passage 33, etc. may be prevented.

An inside surface of the outlet 39 may have an inclined shape as shown in FIG. 3. In other words, the flow sectional area of the outlet 39 may be formed to widen as the outlet 39 goes toward the downstream thereof. The above structure may be to easily discharge moisture to the outside of the outlet 39 even when moisture is generated on the inside surface of the outlet 39 by condensation. Accordingly, the moisture outside the discharge path 36 may not be transferred to the discharge path 36.

A seal 41 may be provided in the cover housing 30. The seal 41 may be integrally provided in the cover housing 30. For example, the seal 41 may be integrally provided in the cover housing 30 by insert molding. The seal 41 may be made of a material having elasticity. The seal 41 may seal the inner space 16 from the outside of the pressure sensor when the cover housing 30 is coupled to the main body housing 10. The seal 41 may include an element seating portion 42. The element seating portion 42 may be in close contact with both edges of a front surface and lateral surfaces of the sensing element 29. The above structure may allow the one surface of the sensing element 29 to communicate with the communicating passage 33, but does not allow the inner space 16 to communicate with the communicating passage 33. In the embodiment, the element seating portion 42 may be formed in a quadrilateral shape.

The seal 41 may be formed to be in close contact with an entire upper end of the side wall 14 of the main body housing 10 in order to seal the inner space 16 from the outside, and part of the seal 31 may be formed to seal an opposite portion of the discharge path 36 which is formed in the cover housing 30.

The cover housing 30 may have a plurality of the coupling pieces 44. The coupling pieces 44 may be provided at locations corresponding to the coupling protrusions 20 of the main body housing 10 and may have the number corresponding to the number of the coupling protrusions 20. The coupling pieces 44 may be elastically deformed by a predetermined amount and may have coupling holes 45 to which the coupling protrusions 20 are provided. In the embodiment, the coupling holes 45 may be formed by penetrating through the coupling pieces 44, but the present disclosure is not limited thereto, and the coupling holes 45 may be formed in a groove shape.

The cover housing 30 may have a mounting bracket 46. The mounting bracket 46 may be provided by encompassing outside surfaces of the cover housing 30. The mounting bracket 46 may be provided to allow the pressure sensor to be mounted to a fixing part of a vehicle. In the embodiment, the mounting bracket 46 may be provided to encompass a remaining portion in the cover housing except for a portion where the discharge tube 38 is located, a portion where the tube connection part 32 is located, and a portion coupled to the main body housing 10. The mounting bracket 46 may have an open window 48 so that the coupling pieces 44 may be exposed to the outside of the pressure sensor.

Hereinbelow, assembly and use of the pressure sensor of the present disclosure configured as described above will be described in detail.

The terminal 26 may be integrally provided in the main body housing 10 by insert molding. The first end of the terminal 26 may be located in the inner space 16 and the second end of the terminal 26 may be located in the coupling space 24. The substrate 28 may be seated on the supports 18 in the inner space 16, and the substrate 28 may be in a state in which the sensing element 29 may be mounted. When the first end of the terminal 26 is coupled to the substrate 28 while the substrate 28 is seated on the supports 18, electric connection may be achieved.

The seal 41 may be integrally provided in the cover housing 30. The seal 41 may be inserted into a mold for forming the cover housing 30 in a pre-manufactured state to be integrally formed with the cover housing 30. When the cover housing 30 into which the seal 41 is inserted is coupled to the main body housing 10, the element seating portion 42 of the seal 41 may be seated in close contact with the lateral surfaces and the edges of the upper surface (located on the basis of the substrate 28) of the sensing element 29. The remaining portions of the seal 41 may be in close contact with the side wall 14 of the main body housing 10. With the above structure, the inner space 16 may be sealed from the outside of the pressure sensor.

Coupling between the main body housing 10 and the cover housing 30 may be achieved as the coupling protrusions 20 are placed into the coupling holes 45 of the coupling pieces 44. During a process in which the coupling protrusions 20 are placed into the coupling holes 45, the coupling pieces 44 may be elastically deformed and restored.

The pressure sensor of the present disclosure assembled as described above may be provided in each of opposite ends of a tube provided inside a bumper of a vehicle. The tube connection part 32 of the pressure sensor may be coupled to the tube. The pressure sensor may be provided in a fixed part of the vehicle, e.g., a bumper or a vehicle frame as the mounting bracket 46 is fixed to fixed part of the vehicle. The pressure sensor of the present disclosure may be configured such that, the tube connection part 32 may be extended horizontally, as shown in FIG. 1, and a portion of the mounting bracket 46 that is located at a lower portion thereof on the basis of the drawing may be fixed to face in the direction of gravity. Therefore, the tube may be extended almost horizontally. The connector part 22 may be coupled to the other connector so that a sensed value of the sensing element 29 provided in the substrate 28 may be transmitted to the outside of the pressure sensor.

As described above, when an impact due to a collision with a pedestrian is applied to the tube while the pressure sensor of the present disclosure is provided by being connected to the tube, a pressure change may occur inside fluid in the tube. Movement of the fluid in response to the pressure change may flow from the tube to the communicating passage 33, and then pass through the communicating passage 33 to apply the pressure of the fluid to the sensing element 29. Therefore, sensing in the sensing element 29 may be performed, and a value sensed in the sensing element 29 may be transmitted to the other connector via the terminal 26 so as to be transmitted to the outside of the pressure sensor. As described above, as the sensed value of the sensing element 29 is transmitted to the outside of the pressure sensor to cause a post-operation, a pedestrian airbag may be activated when a condition for the pedestrian airbag to be activated is met.

The inflow orifice 34 may be provided in the downstream side of the communicating passage 33. The inflow orifice 34 may allow the speed of the fluid that passes therethrough to be faster so that sensing in the sensing element 29 may be rapidly performed.

It may be preferable that the inside of the tube may be maintained constant at the atmospheric pressure at all times. Therefore, the pressure sensor of the present disclosure may be configured to allow the discharge path 36 to communicate with the communicating passage 33. The discharge path 36 may communicate with the outside of the pressure sensor via the discharge orifice 37 and the outlet 39. The discharge orifice 37 may allow the fluid to be rapidly discharged via the outlet 39. As the communicating passage 33 communicates with the outside of the pressure sensor via the discharge path 36 and the outlet 39, the inside of the tube may be maintained at the atmospheric pressure normally.

The membrane 40 provided in the discharge orifice 37 located between the discharge path 36 and the outlet 39 may allow air to pass therethrough, but does not allow foreign substances such as water, dust, etc. to pass therethrough. Accordingly, foreign substances such as water, dust, etc. do not enter the communicating passage 33 via the discharge path 36. A problem in which the communicating passage 33 is clogged by water or dust or an operation of the sensing element 29 deteriorates may be eliminated. The inclination in the inside surface of the outlet 39 may discharge moisture generated on the outlet 39 to the outside of the outlet 39, so that the moisture may be prevented from being delivered to the membrane 40.

The inner space 16 may be sealed by the seal 41 provided in the cover housing 30 and by the cover housing 30. Accordingly, the substrate 28 provided in the inner space 16 may be completely unaffected by external influence, so there is no possibility of malfunction.

Hereinafter, even when all the components constituting the embodiment of the present disclosure are described as being coupled to each other or operated in combination as one, the present disclosure is not necessarily limited to the embodiment. Within the scope of the present disclosure, all of the components may be operated by being selectively combining at least one of the components. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although preferred embodiment of the present disclosure has been described for illustrative purposes, those skilled in the art will appreciate that various modifications, additions and substitutions are possible, without departing from the scope and spirit of the present disclosure as disclosed in the accompanying claims. Therefore, the preferred embodiment described above have been described for illustrative purposes, and should not be intended to limit the technical spirit of the present disclosure, and the scope and spirit of the present disclosure are not limited to the embodiment. The protective scope of the present disclosure should be interpreted by the accompanying claims, and all technical spirits within the equivalent scope should be interpreted as being included in the scope and spirit of the present disclosure.

The invention claimed is:

1. A pressure sensor comprising:
a main body housing having an inner space, and having a connector part provided for connection with an outside thereof, wherein a first end of a terminal is located in the inner space and a second end thereof is located in the connector part;
a substrate provided in the inner space of the main body housing and on which a sensing element is mounted;
a cover housing coupled to the main body housing and comprising a seal configured to be in contact with the main body housing and with edges of one surface of the sensing element;
a communicating passage communicating with the inner space in a straight line, thus communicating with one surface of the sensing element at a downstream side thereof;
a discharge path communicating with both the communicating passage and the outside of the pressure sensor and configured to allow pressure in a tube connected to the communicating passage to be maintained at atmospheric pressure; and
a discharge tube extended from the discharge path and having an outlet configured to communicate with the outside of the pressure sensor,
wherein the outlet is configured such that a flow sectional area thereof is enlarged as the outlet goes to a downstream thereof and an inner surface thereof is inclined, and wherein the communicating passage and the discharge path are extending in different directions.

2. The pressure sensor of claim 1, wherein an inflow orifice is provided at the downstream side of the communicating passage so that fluid rapidly flows into the sensing element, and the communicating passage is open toward the sensing element.

3. The pressure sensor of claim 2, wherein a discharge orifice is provided at a downstream side of the discharge path so that the fluid is rapidly discharged via the discharge path.

4. The pressure sensor of claim 2, wherein the seal has a sensor seating portion that is configured to be in contact with lateral surfaces and edges of an upper surface of the sensing element by encompassing the lateral surfaces and the edges of the upper surface of the sensing element in order to seal the communicating passage and the inner space.

5. The pressure sensor of claim 4, wherein the seal is integrally formed in the cover housing by insert molding.

6. The pressure sensor of claim 1, further comprising:
a membrane provided in the outlet and configured to block delivering of foreign substances into the discharge path and to pass only air.

7. The pressure sensor of claim 6, wherein the membrane is provided at a discharge orifice located between the discharge path and the outlet to be located in the outlet.

8. The pressure sensor of claim 6, wherein the seal has a sensor seating portion that is configured to be in contact with lateral surfaces and edges of an upper surface of the sensing element by encompassing the lateral surfaces and the edges of the upper surface of the sensing element in order to seal the communicating passage and the inner space.

9. The pressure sensor of claim 8, wherein the seal is integrally formed in the cover housing by insert molding.

10. The pressure sensor of claim 1, wherein the seal has a sensor seating portion that is configured to be in contact with lateral surfaces and edges of an upper surface of the sensing element by encompassing the lateral surfaces and the edges of the upper surface of the sensing element in order to seal the communicating passage and the inner space.

11. The pressure sensor of claim 10, wherein the seal is integrally formed in the cover housing by insert molding.

* * * * *